United States Patent Office 3,746,615
Patented July 17, 1973

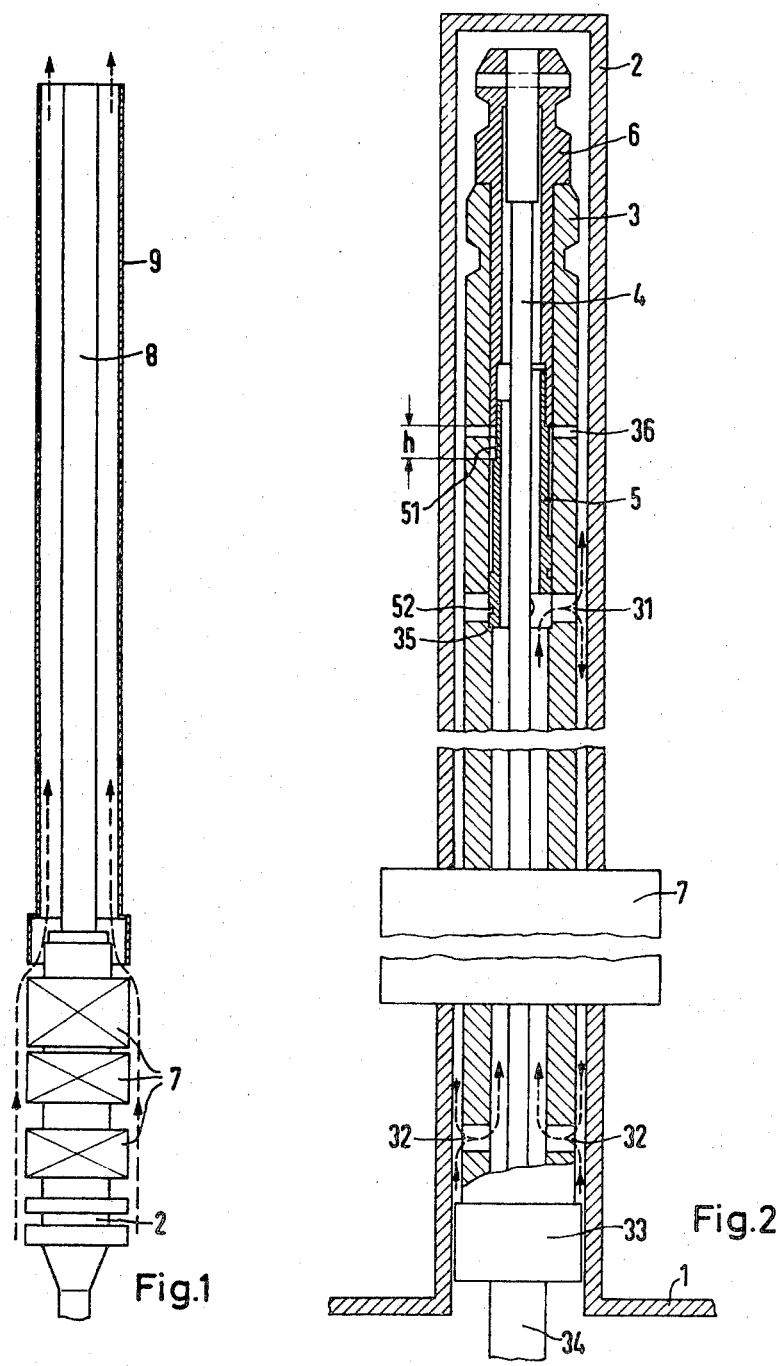

3,746,615
DRIVING DEVICE FOR REGULATOR RODS OF NUCLEAR REACTORS
Hans Rottger and Hans-Peter Schabert, Erlangen, Germany, assignors to Siemens Aktiengesellschaft, Berlin and Munich, Germany
Filed Oct. 1, 1970, Ser. No. 77,213
Claims priority, application Germany, Oct. 11, 1969,
P 19 51 418.2
Int. Cl. C21c 7/12
U.S. Cl. 176—36 R
4 Claims

ABSTRACT OF THE DISCLOSURE

A device for driving the regulator rods of fluid-cooled nuclear reactors comprises a tubular drive rod from which a regulator rod is suspended. The drive rod is operatively linked with a motion control mechanism, such as a magnetic jack. The tubular wall of the drive rod has openings axially spaced from each other to jointly define a coolant flow path lengthwise through the tubular drive rod. A displaceable shut-off member, preferably a tubular slider, normally closes the flow path inside the tubular drive rod and temporarily opens the path in response to forces exerted by the coolant when the tubular drive rod rapidly travels downward.

---

Our invention relates to a driving device for the regulator rods of fluid-cooled nuclear reactors, such as water-cooled reactors.

In a more particular aspect, the invention concerns a driving device for regulator rods which comprises a driving mechanism acting upon a hollow tubular drive rod from whose lower end the regulator rod is suspended by means of a coupling, a pull rod being located in the interior of the tubular drive rod for controlling the coupling. The driving mechanism proper may be operated by an electric or hydraulic motor, or it may be of the magnetic jack type. Particularly well suitable is a magnetic jack drive mechanism in which magnetically controlled retainer or detent structures enter into engagement with the tubular drive rod and operate to raise or lower the drive rod together with the regulator rod suspended therefrom. The tubular drive rod is axially displaceable in a pressure tube which is tightly joined with the pressure tank of the reactor and for that reason has the same internal pressure as the reactor tank, being also filled by the medium located in the interior of the reactor pressure tank. For example, in a pressurized water reactor, the pressure tube together with the entire retainer or detent structures of the magnetic jack, as well as the tubular drive rod, is surrounded by pressurized water of high temperature, especially in reactor plants in which the driving equipment is mounted above the reactor core assembly. The magnet coils for controlling the retainer or detent system of the jack are located around the pressure tube and an inductive position indicator is also mounted outside of the pressure tube.

It is essential that the regulating rods of the nuclear reactor can be moved not only slowly in the upward and downward directions, but they must also be suitable for rapid shut-down or emergency scramming of the reactor, for which purposes they must be capable of most rapidly reaching the lowermost position within the reactor core. For this purpose the retainment by the jack or its detents, or by any other connection with the driving mechanism of the rod, must be released so that the rod with its drive rod will drop by gravity into the reactor core. To permit such a rapid operation, relatively large clearances are needed between the drive rod and the pressure tube surrounding the rod. These clearances, for example, require the annular gaps to have a radial width of up to 3 mm. Nevertheless, in the event of rapid downward travel of the regulating rod, such gaps still constitute a relatively large resistance to the occurring equalizing flow of the coolant contained in the pressure tube. For that reason, the interior of the tubular drive rod can also be utilized for pressure and flow equalization during rapid downward travel. To do this, the tubular wall of the drive rod may be provided with transverse bores near its upper and lower ends.

Such transverse bores, however, entail the disadvantage that the radial and axial temperature gradients during driving operation may cause a water circulation, that is, the hot water from the reactor pressure tank will reach the interior of the tubular drive rod through the lower transverse bore, will then ascend in the tubular drive rod, and emerge from the upper transverse bore into the pressure tube that surrounds the drive rod. Thereafter the water issues a portion of its heat content to the pressure tube while flowing back into the pressure tank of the reactor along a path which, within the surrounding pressure tube, is located outside of the tubular drive rod. As a result, an undesirably large quantity of heat is dissipated in the upward direction and through the surface of the surrounding pressure tube, even when the drive rod is at a standstill. This detrimental effect is particularly pronounced during full-load operation with an almost fully pulled out drive rod, so that the position indicating devices outside of the pressure tube are subjected to large temperature stresses. The same applies to the magnetic driving devices of the jack. It has heretofore been necessary, therefore, to additionally cool these components mounted externally on the pressure tube. For example, a blower has been used for such auxiliary cooling purposes. In any event, the need for additional cooling involves an appreciable expenditure in equipment, space and maintenance, aside from causing a continuous power loss.

It is an object of our invention to minimize or obviate such temperature stresses on the position indicating devices and driving mechanism and to reduce the loss of power heretofore encountered by the above-mentioned phenomena.

Another, more specific object of our invention is to prevent the above-mentioned circulatory flow of hot coolant under normal operating conditions and to release such circulatory flow only temporarily during downward travel of the regulator rod.

Still another object of our invention is to improve the heat dissipation from the vicinity of the pressure tube that surrounds the drive rod of the drive system in reactor plants generally of the above-mentioned types.

To achieve these objects, and in accordance with a feature of our invention, we provide the tubular drive rod in a regulator-rod driving assembly of the type mentioned, with respective openings at the lower and upper ends respectively, or in any event so spaced from each other in the axial direction, as to jointly define a fluid-flow path of reactor coolant lengthwise through the tubular drive rod. However, we also provide the tubular drive rod with a shut-off member which normally, that is during periods in which the regulator rod remains stationary, closes the flow path inside the tubular drive rod but which is responsive to the forces exerted by the coolant during downward movement of the driving rod, so that the shut-off member then temporarily and short-lastingly opens the flow path.

According to another feature of our invention, the shut-off member preferably consists of a blocking slider which is located inside the tubular drive rod and closes one of the transverse openings, for example the opening near the upper end of the drive rod, the slider being kept in its normal closing position either by gravity or by spring force or both. Then the slider will open only when it becomes subjected to the flow forces of the coolant in the interior of the hollow driving rod and only when the travel of the driving rod is in the downward direction.

During rapid downward travel of the tubular drive rod, the slider or other shut-off member is subject to a differential pressure, for example of 2 kg./cm.$^2$, whereas the differential pressure which tends to drive the natural circulation amounts, for example, to only 0.05 kg./cm.$^2$. Consequently, by providing such a blocking member, the circulatory flow of hot coolant is normally prevented and is released only in the event the regulating rod will rapidly travel downwardly. The intervals of time during which such downward travel occurs are short so that the temporary opening of the circulatory path does not impose appreciable temperature stress upon the environment of the pressure tube that surrounds the driving rod.

For improving the heat dissipation from the environment of the pressure tube it is further preferable, according to another feature of our invention, to envelop the pressure tube in an envelope which is open at the bottom and at the top in order to operate as a chimney. Such an envelope does not require an appreciable additional amount of space and, if desired, the housing of the entire driving equipment including the position indicating device may be given a correspondingly adapted shape.

For further describing the invention, reference will be made to an embodiment illustrated by way of example on the accompanying drawings, in which:

FIG. 1 is an over-all view of a complete driving equipment for one of the regulator rods of a nuclear reactor; and FIG. 2 shows in section the lower portion of the same equipment which includes the driving device that embodies the features of the present invention.

The example chosen for illustration is provided with a magnetic jack device, although it will be understood from the foregoing that the particular type of motion control mechanism is not essential to the invention proper.

FIG. 1 shows partly an exterior view of the pressure tube 2 in which the drive rod is movable in the vertical direction. The pressure tube 2 is surrounded by magnet coils 7 which operate upon retainer or detent mechanisms located in the interior of the tube 2. Disposed above the set of magnet coils 7 is a vertically elongated coil 8 which forms part of a position indicator and extends over the entire upper length of the pressure tube 2. Radially and peripherally spaced from the position indicator coil 8 is a chimney envelope 9 which provides a cooling channel for improved heat dissipation from the vicinity of the pressure tube 2 without the necessity of using an additional blower, although, if desired, such a blower may also be arranged at the lower or upper end of the chimney envelope 9.

FIG. 2 shows a longitudinal section through the pressure tube 2 whose bottom is pressure-tightly joined with the top wall 1 of the reactor pressure tank. Vertically displaceable in the interior of the pressure tube 2 is a tubular driving rod 3 under control by a control mechanism here represented only by one of the magnetic control coils 7.

A more than schematic representation of the magnetic jack mechanism of which the coils 7 form part, is not offered in this specification because magnetic jacks are well known as such, for example from U.S. Pats. No. 3,122,027, 3,132,290 and 3,158,766.

Reverting to FIG. 2 of the present disclosure, it will be seen that the lower end of the driving rod 3 carries a coupling 33 by means of which the regulator rod 34 is suspended. A pull rod 4 in the interior of rod 3 serves to control the coupling 33. For this purpose, the pull rod 4 is connected with the head 6 of the pull rod assembly.

Coolant inlet bores 32 traverse the wall of the tubular drive rod 3 near the lower end thereof. Corresponding outlet bores 31 are provided near the upper end of rod 3.

In the devices heretofore known, an equalizing flow as indicated in FIG. 2 by broken lines may develop through the bores 32 and 31. To prevent the occurrence of such a circulating flow whenever the drive rod 3 is at standstill, a blocking slider 5 is provided in the upper portion of the drive rod. Normally, the slider 5 rests upon an inner shoulder 35 of the drive rod 3 and in this position closes the outlet bores 31. The slider 5, being generally of cylindrical shape, has its upper portion guided in the pull-rod head.

During downward travel of the driving rod 3, the fluid pressure of the coolant in the interior of the rod lifts the blocking slider 5 a vertical distance $h$ with the effect of opening the outlet bores 31. This operating condition is illustrated in the right-hand portion of FIG. 2 in contrast to the lefthand portion where the slider 5 is shown in blocking position. When the cylindrical slider 5 opens the outlet bores 31, the water contained in the guiding gap of the slider may escape outwardly through a small equalizing bore 36. Upon termination of the downward motion, the fluid pressure ceases, the blocking slider, due to its own gravity, again drops down onto the shoulder 35 of the driving rod and thus closes the outlet bores 31, again preventing a flow of coolant through these bores.

The diametrical clearances required for easy movement of the blocking slider 5 are so small that the corresponding high flow resistances of these narrow annular passages do not permit the formation of a detrimental circulation of water. Due to the abrupt and stepwise actuation of the motion control mechanism, the displacement of the blocking slider 5 always lasts a very short interval of time so that no impurities of the primary water can become deposited and thus result in clamping of the slider. The easy movability of the blocking slider 5 can readily be checked manually after disassembling the driving rod. For this purpose it is only necessary to stick a small object, for example a small screwdriver, through the transverse bores into a groove 52 and to then move the blocking slider 5 in the axial direction of the drive rod.

It will be recognized that in a device according to the invention, such as the one illustrated and described herein, the heat exchanging circulation of water is prevented during standstill of the driving rod. In addition, the stagnating layer of water in the gaps also retards the transfer of heat toward the outside from any hot water which, from the last preceding downward movement, may still be retained in the interior of the tubular drive rod 3. Consequently, undesirably high temperature stresses of the devices located outside of the pressure tube, such as the control mechanism and position indicating coils, cannot occur. Nevertheless, the equalizing flow of coolant needed for rapid shut-down or scramming of the reactor is not affected.

The invention, of course, is not only of advantage with pressurized water reactors but also, for example, with nuclear reactors operating with gaseous coolant or liquid-metal coolant in which similar problems are apt to occur. Furthermore, the blocking member constituted by a tubular slider in the illustrated example may be substituted by a different but technologically equivalent blocking member; for example a valve may be located at any place suitable to normally block off the undesirable circulation of coolant fluid.

Upon a study of this disclosure it will be obvious to those skilled in the art that our invention permits of various other modifications and hence can be given embodiments other than particularly illustrated and described herein, without departing from the essential features of our invention and within the scope of the claims annexed hereto.

We claim:
1. In a fluid cooled nuclear reactor having a tank wall, a control device comprising a pressure tube secured to said tank wall, the inside of said tube being in communication with the reactor tank through said tank wall, a tubular driving rod disposed for movement in said pressure tube, a reactor control rod extending into the tank, means for coupling said control rod to said tubular driving rod through said tank wall, means for controlling the motion of said driving rod so as to effect a raising and lowering of said drive rod within said pressure tube, and means for equalizing the reactor coolant hydraulic pressure and coolant flow throughout the length of said pressure tube, including upper and lower apertured portions in the wall of said tubular driving rod and axially spaced thereon, said apertures placing the coolant in the reactor tank in fluid communication with the interior of said tubular drive rod and the interior of said tubular drive rod in fluid communication with the interior of said pressure tube, and a shut-off hydraulically movable member for said apertured portions disposed inside said tubular drive rod, said last-named member being normally disposed to shut off said upper apertured portions responsive solely to the flow forces of the coolant as a function of movement of said control rod.

2. A device according to claim 1 wherein said tubular drive rod extends vertically when operatively joined with the reactor, means for connecting a lower one of said apertured portions with the interior of the reactor so that fluid coolant from the reactor can enter through said lower portion, and said shut-off member being vertically displaceable to normally close one of said apertured portions by gravity bias.

3. In a device according to claim 1 said shut-off member being a tubular slider disposed coaxially in the interior of said tubular drive rod.

4. A device according to claim 1 wherein said tubular drive rod extends vertically when operatively joined with the reactor, an envelope tube coaxially surrounding said tubular drive rod with radial clearance and being open at the bottom and at the top for chimney action.

References Cited
UNITED STATES PATENTS 3,321,372    5/1967    Challender _____ 176—36 R

FOREIGN PATENTS 1,129,631   12/1962   Germany _____ 176—36 R

CARL D. QUARFORTH, Primary Examiner

H. E. BEHREND, Assistant Examiner